(12) United States Patent
Tanaka

(10) Patent No.: US 10,097,769 B2
(45) Date of Patent: Oct. 9, 2018

(54) MODULATING LIGHT INCIDENT ON IMAGING SENSOR

(71) Applicants: Sony Corporation, Tokyo (JP); Sony Pictures Entertainment Inc., Culver City, CA (US)

(72) Inventor: Kazunori Tanaka, Irvine, CA (US)

(73) Assignees: SONY CORPORATION, Tokyo (JP); SONY PICTURES ENTERTAINMENT INC., Culver City, CA (US)

(*) Notice: Subject to any disclaimer, the term of this patent is extended or adjusted under 35 U.S.C. 154(b) by 0 days.

(21) Appl. No.: 14/859,123

(22) Filed: Sep. 18, 2015

(65) Prior Publication Data

US 2017/0085769 A1 Mar. 23, 2017

(51) Int. Cl.
*H04N 5/235* (2006.01)
*G02F 1/01* (2006.01)
*H04N 5/225* (2006.01)

(52) U.S. Cl.
CPC ......... *H04N 5/2355* (2013.01); *G02F 1/0121* (2013.01); *G02F 2203/12* (2013.01); *H04N 5/2254* (2013.01)

(58) Field of Classification Search
CPC .................................................. H04N 5/23254
USPC .................................................. 348/302, 335
See application file for complete search history.

(56) References Cited

U.S. PATENT DOCUMENTS

| | | | |
|---|---|---|---|
| 7,532,323 B2 | 5/2009 | Tang et al. | |
| 8,675,119 B2 | 3/2014 | Nayer et al. | |
| 2004/0130649 A1* | 7/2004 | Lee | H04N 5/23212 348/345 |
| 2008/0283726 A1* | 11/2008 | Uya | H01L 27/14603 250/208.1 |
| 2012/0274822 A1* | 11/2012 | Smith | H04N 5/23254 348/302 |
| 2014/0168482 A1 | 6/2014 | Herman et al. | |
| 2015/0244918 A1* | 8/2015 | Svensson | H04N 5/2353 348/229.1 |

OTHER PUBLICATIONS

Mannami, H., et al. "High Dynamic Range Camera using Reflective Liquid Crystal," Computer Vision, 2007. ICCV 2007. IEEE 11th International Conference on, 8 pages.

* cited by examiner

*Primary Examiner* — Joel Fosselman
(74) *Attorney, Agent, or Firm* — Procopio, Cory, Hargreaves & Savitch LLP

(57) ABSTRACT

An image sensor, including: a sensing layer having a plurality of sensing elements, each sensing element configured to record impinging photons; and an attenuation layer coupled to the sensing layer, the attenuation layer configured with a plurality of attenuation elements to modulate light incident on the sensing layer. Key words include sensing layer and attenuation layer.

13 Claims, 3 Drawing Sheets

MODULATING LIGHT INCIDENT ON IMAGING SENSOR

BACKGROUND

Field of the Invention

The present invention relates to sensors, and more specifically, to a sensor coupled with an attenuation layer.

Background

An imaging system depends on an image sensor to generate an electronic representation of a visual image. Examples of image sensors include charge-coupled device (CCD) image sensors and active pixel sensor (APS) devices. Typically, these imaging sensors include a plurality of light sensitive pixels (or sensing elements) arranged in a regular pattern of rows and columns.

The quality of an image captured on an imaging sensor depends partly on the dynamic range of the light recorded by the sensor. Thus, an image sensor that can provide a wider dynamic range than the dynamic range provided by the conventional image sensor is desirable. For example, when capturing scenes that include wide ranges of brightness, such as from direct sunlight to deep shadow, and exposing the image so as to obtain good signal in the dark areas, the stronger light in the bright areas will saturate the sensing elements, and the actual light radiance cannot be obtained. Accordingly, high dynamic range sensors are needed for capturing scenes that include such wide ranges of brightness.

SUMMARY

The present invention provides for having an attenuation layer coupled to a sensing layer of an image sensor to modulate the amount of light incident on the image sensor.

In one implementation, an image sensor is disclosed. The image sensor includes: a sensing layer having a plurality of sensing elements, each sensing element configured to record impinging photons; and an attenuation layer coupled to the sensing layer, the attenuation layer configured with a plurality of attenuation elements to modulate light incident on the sensing layer.

In another implementation, a method is disclosed. The method includes: recording photons incident on a sensing layer having a plurality of sensing elements; coupling an attenuation layer having a plurality of attenuation elements to the sensing layer, the attenuation layer configured to modulate intensities of the photons incident on the sensing layer; and storing the recorded photons.

In another implementation, an apparatus is disclosed. The apparatus includes: means for sensing and recording photons, the means for sensing and recording including a plurality of sensing elements; means for attenuating intensities of the photons incident on the means for sensing and recording, the means for attenuating including a plurality of attenuation elements, each attenuation element configured to attenuate the intensities of the photons incident on a corresponding sensing element; and means for storing the photons sensed and recorded by the means for sensing and recording.

Other features and advantages of the present invention should be apparent from the present description, which illustrates, by way of example, aspects of the invention.

BRIEF DESCRIPTION OF THE DRAWINGS

The details of the present invention, both as to its structure and operation, may be gleaned in part by study of the appended further drawings, in which like reference numerals refer to like parts, and in which.

DETAILED DESCRIPTION

Several implementations as disclosed herein provide for having an attenuation layer coupled to a sensing layer of an image sensor to modulate the amount of light incident on the image sensor. Thus, in one implementation, the attenuation layer modulates the light incident on the sensing layer using a layer of attenuation elements with adjustable transparency. In one implementation, the image sensor is configured with a sensing layer including a plurality of sensing elements (or sensels), while the attenuation layer is configured with a plurality of attenuation elements placed on top of the sensing elements. In one implementation, the attenuation layer is configured with the same or fewer number of attenuation elements as the sensing elements in the sensing layer. Thus, an attenuation element attenuates the amount of light reaching the corresponding sensel disposed below the attenuation element. Each attenuation element is configured with material that can attenuate the amount of light. In one implementation, the attenuation element is configured with liquid crystals as is done in a liquid crystal display. In another implementation, the attenuation element is configured with smart glass (including electrochromic, photochromic, thermochromic, suspended particle, micro-blind and polymer dispersed liquid crystal devices), which alter the light transmission properties when voltage, light or heat is applied. Generally, the smart glass changes from translucent to transparent, changing from blocking some or all wavelengths of light to letting light pass through.

After reading this description it will become apparent how to implement the disclosure in various implementations and applications. However, although various implementations of the present disclosure will be described herein, it is understood that these implementations are presented by way of example only, and not limitation. As such, this detailed description of various implementations should not be construed to limit the scope or breadth of the present disclosure.

Figure 1:
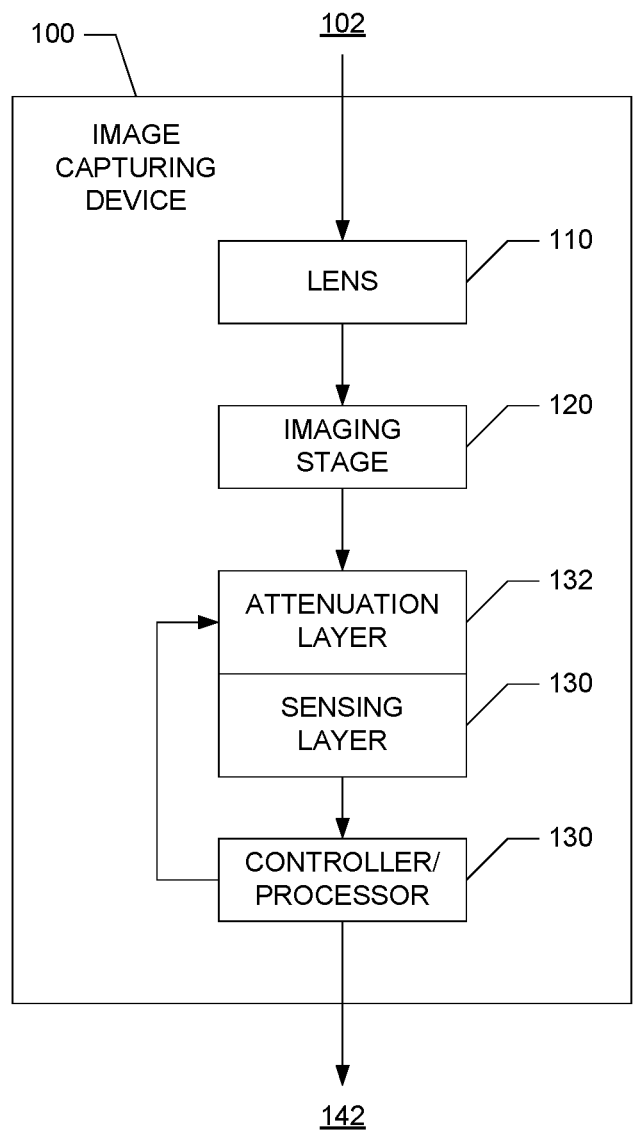
FIG. 1 is a functional block diagram illustrating an image capturing device in accordance with one implement of the present disclosure.

FIG. 1 is a functional block diagram illustrating an image capturing device 100 in accordance with one implement of the present disclosure. In one implementation, the image capturing device 100 is configured as a digital camera. In other implementations, the image capturing device 100 is configured as other types of image capturing devices. In the illustrated implementation of FIG. 1, the image capturing device 100 includes a lens 110, an imaging stage 120, an image sensor including a sensing layer 130 and an attenuation layer 132, and a controller/processor 140.

The lens 110 receives and focuses the light 102 from a subject scene to form an image on the sensing layer 130 of the image sensor. The image sensor converts the incident light to an electrical signal for each pixel. In one implementation, the image sensor is a charge-coupled device (CCD) type. In another implementation, the image sensor is an active pixel sensor (APS) type, which is often referred to as a complementary metal oxide semiconductor (CMOS) sensor because of the ability to fabricate them using a CMOS fabrication process.

In one example, the operation of an image sensor (e.g., an APS) is performed in three steps: a reset step, where the sensor is reset from the previous integration cycle; an image integration step, where the light energy is collected and converted into an electrical signal; and a signal readout step, where the signal is read out. During the image integration step, light energy, in the form of photons, strikes a photodiode in a sensel, thereby creating a number of electron-hole pairs. The photodiode is designed to limit recombination between the newly-formed electron-hole pairs. Thus, the holes are attracted to the ground terminal of the photodiode, while the electrons are attracted to the positive terminal of the photodiode where each additional electron reduces the voltage on the photodiode. At the end of the integration period, the number of photons that were absorbed by the photodiode during the image integration period can be determined by subtracting the voltage at the end of the integration period from the voltage at the beginning of the integration period.

The imaging stage 120 may include elements such as a neutral density (ND) filter, an iris, a shutter, exposure controller, brightness sensor, and/or other units configured to regulate the amount of light reaching the image sensor. For example, the ND filter can be used to reduce or modify the intensity of all wavelengths or colors of light equally, which reduces the amount of light entering the lens. Thus, the presence of the ND filter allows a photographer to select combinations of aperture, exposure time, and sensor sensitivity to produce pictures with less overexposure. The iris and the shutter may be configured to regulate the amount of light reaching the image sensor by controlling the aperture and the duration of the shutter opening. The exposure controller may respond to the amount of light available in the scene as metered by the brightness sensor and control other elements including the neutral density (ND) filter, the iris, and/or the shutter.

The dynamic range is determined by the maximum number of photons that a sensor can collect during an integration period without saturating (i.e., exceeding the capacity of) the sensor, and the minimum number of photons that a sensor can collect during the integration period that can be detected over the noise floor. As stated above, processing images with drastic lighting changes is a challenge for an image capturing device with a limited dynamic range. Thus, if the integration period of the sensor is shortened to the point where none of the bright-light information is lost, i.e., where the number of collected photons will not exceed the capacity of the sensor during the integration period, then most, if not all, of the low-light information will be lost (resulting in areas of the image that are crushed to black) because the collected photons will not be distinguishable over the noise level. In contrast, if the integration period of the sensor is increased to capture the low-light information, i.e., where the number of collected photons is detectable over the noise floor, then a significant portion of the bright-light information is lost (resulting in areas of the image that are blown out to white) because the number of collected photons will exceed the capacity of the sensor.

In one implementation, the image sensor is configured with a sensing layer 130 and an attenuation layer 132 coupled to the sensing layer 130 to modulate the amount of light incident on the sensing layer 130. As stated above, the attenuation layer 132 includes a plurality of attenuation elements, which can be selectively controlled by the controller/processor 140 to adjust the transparency of the attenuation elements. The data captured by the image sensor is then processed by the controller/processor 140 to recreate the original intensity of the light on the sensor to form an output image 142 with a higher dynamic range than the sensor could have taken without the attenuation layer. In some implementations, the attenuation layer 132 replaces some or all of the elements making up the imaging stage 120 such as a neutral density (ND) filter, an iris, a shutter, exposure controller, brightness sensor, and/or other units configured to regulate the amount of light reaching the image sensor.

Figure 2:
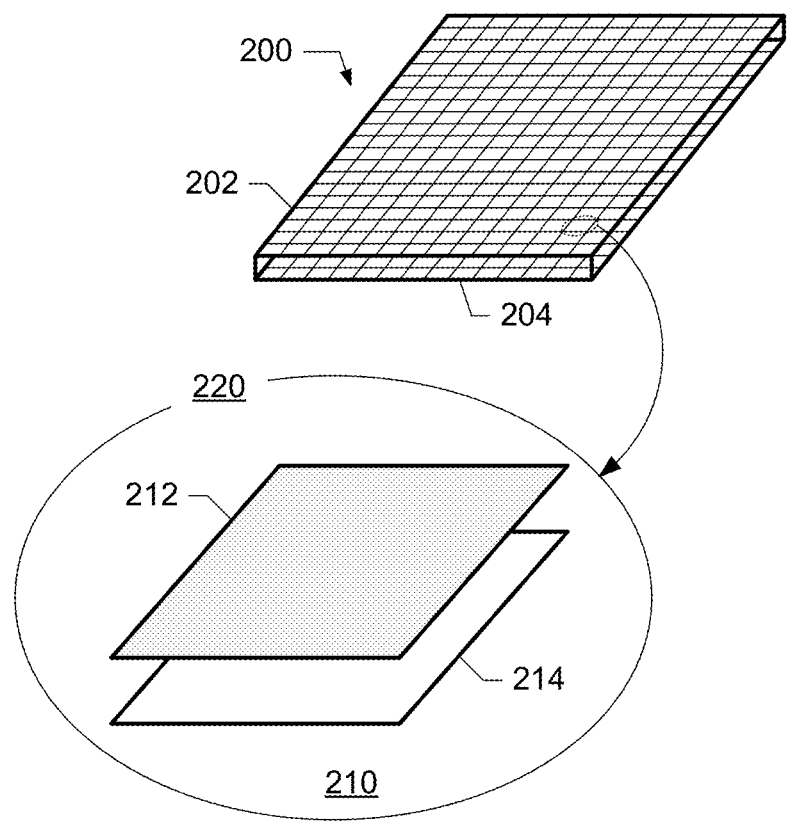
FIG. 2 is a functional diagram of an image sensor 200 that is one implementation of the image sensor configured with a sensing layer and an attenuation layer shown in FIG. 1.

FIG. 2 is a functional diagram of an image sensor 200 that is one implementation of the image sensor configured with a sensing layer 130 and an attenuation layer 132 shown in FIG. 1. In FIG. 2, a single pixel 210 of the image sensor 200 is illustrated in detail in oval 220. As shown, the pixel 210 includes an attenuation element 212 coupled to a sensel 214.

In one implementation of the image sensor 200, the attenuation layer 202 is configured such that the attenuation values for the attenuation elements are adjusted evenly over the sensing layer 204 of the image sensor 200. Thus, in this implementation, the attenuation layer 202 acts as a neutral density filter of varying strength. Further, using the above-described configuration, a plurality of images can be captured sequentially by the sensing layer 204 at multiple values of attenuation, which can then be combined to produce at least one high-dynamic range image. In one variation, the attenuation layer 202 can be used as a global shutter. In another variation, the attenuation layer 202 can be used to emulate a rolling-shutter effect in video by allowing light to go through the attenuation layer line-by-line over time.

In another implementation, a pattern of varying densities is applied on the attenuation layer 202 to equalize the acquisition of a frame of image. For example, lenses often "vignette" to varying degrees, where the image it creates has a darkening that usually increases radially from the center of the image. A reverse "vignetting" pattern can be applied to acquire a frame of image with an even exposure throughout the frame, which optimizes the exposure. Thus, applying the pattern using the attenuation layer 202 provides an advantage over making such changes (e.g., vignetting) in a post-production processing by not reducing the signal-to-noise ratios during the process of gaining up the image where areas are darkened.

In another implementation, each attenuation element 212 of an image sensor 200 is configured as a per-sensel neutral density filter that can be individually controlled. Thus, in this implementation, an image is captured to determine which sensels are saturating. Subsequent image(s) can then be captured with attenuation elements corresponding to the saturated sensels darkened to avoid saturation. Accordingly, the sensels that were saturated in the previous image can record a higher value of light and increase the dynamic range of the image sensor.

In yet another implementation, the above-described process can be iterated to find the proper value of attenuation for each attenuation element 212 in the attenuation layer 202, until no more sensels are being saturated. For example, an attenuation value for each attenuation element 212 is increased by a pre-determined amount (e.g., a fixed amount or progressively increasing by fixed amount) until the corresponding sensel 214 is not being saturated. However, when the final image is output, the attenuation values of the attenuation elements are recorded so that the true image values can be reconstructed. In another implementation, the reconstruction calculation is done first, and subsequently recorded.

In another implementation, the attenuation layer 202 is configured as having multiple attenuation layers, to increase the amount of modulation. In another implementation, the attenuation layer could have a pattern that acts as a mask. In another implementation, the attenuation pattern can be changed over the duration of the exposure to create the image. For example, while the shutter is open, the overall attenuation for the entire image could start from being completely opaque, and be decreased over time. This would create a fade-in effect. Another example of usage would be to configure the attenuation layer to be opaque only during certain intervals in time, making for an image that would emulate strobed lighting. Such effects could be combined in more complicated ways to create images such as one that looks like a composite of strobed images, all fading in. This time-changing feature can be combined with patterns of attenuation as described in earlier implementations.

In a further implementation, some or all of the above-described implementations are combined to produce an overall modulation for an image sensor 200. For example, for each attenuation element corresponding to an imaging element, the product of the transmission ratios that each attenuation element would have for any given attenuation pattern (whether in space and/or time) for a feature described in prior implementations (or any other) would produce a value for the attenuation element that would allow for the image to be taken in one-shot, while having all the intended features.

Figure 3:
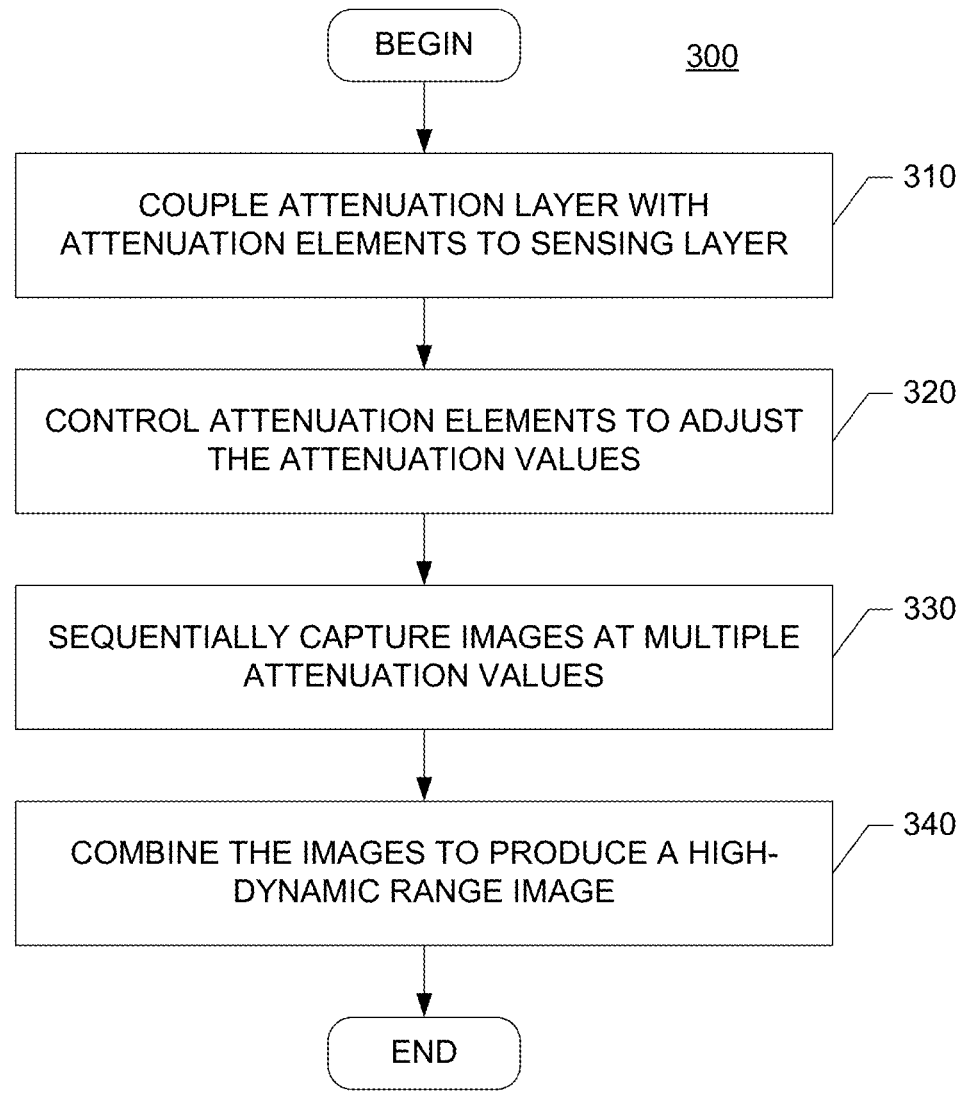
FIG. 3 is a flow diagram illustrating a method for configuring an image sensor including an attenuation layer to modulate the amount of light incident on the image sensor in accordance with one implementation of the present disclosure.

FIG. 3 is a flow diagram illustrating a method 300 for configuring an image sensor including an attenuation layer to modulate the amount of light incident on the image sensor in accordance with one implementation of the present disclosure. In the illustrated implementation of FIG. 3, an attenuation layer configured with a plurality of attenuation elements is coupled to a sensing layer of an image sensor, at block 310.

The attenuation elements are then controlled, at block 320, to adjust the attenuation values. In one implementation, the attenuation values for the attenuation elements are adjusted evenly over the entire plurality of sensels of the sensing layer 204. Thus, the attenuation layer 202 acts as a neutral density filter of varying strength for the sensing layer 204 of the image sensor 200. Images can be captured sequentially at multiple values of attenuation, which can then be combined to produce high-dynamic range image(s). In one variation, the attenuation layer 202 can be used as a global shutter. In another variation, the attenuation layer 202 can be used to provide a rolling-shutter effect in video. In another implementation, a pattern of varying densities is applied on the attenuation layer 202 to spatially equalize the acquisition of an image. For example, a reverse "vignetting" pattern can be applied to acquire an image with an even exposure throughout the frame, which optimizes the exposure. Thus, applying the pattern using the attenuation layer 202 provides an advantage over making such changes (e.g., vignetting) in a post-production processing by not reducing the signal-to-noise ratios where areas are darkened. In another implementation, each attenuation element 212 of an image sensor 200 is configured as a per-sensel neutral density filter that can be individually controlled. Thus, in this implementation, an image is captured to determine which sensels are saturating. Subsequent image(s) can then be captured with attenuation elements corresponding to the saturated sensels darkened. In yet another implementation, the above-described process can be iterated to find the proper value of attenuation for each attenuation element 212 in the attenuation layer 202, until no more sensels are being saturated. For example, an attenuation value for each attenuation element 212 is increased or decreased by a predetermined amount (e.g., a fixed amount or progressively increasing/decreasing by fixed amount) until the corresponding sensel 214 is not being saturated. However, when the final image is output, the attenuation values of the attenuation elements are recorded so that the true image values can be reconstructed. In another implementation, the reconstructed values are recorded instead. In another implementation, the attenuation pattern can be changed over time during the exposure to create interesting effects such as (but not limited to) strobes and fade-ins/outs.

The method 300 further includes sequentially capturing a plurality of images at multiple values of attenuation, at block 330. The images are then combined, at block 340, to produce a high-dynamic range image. In a further implementation, some or all of the above-described processes are combined.

The foregoing methods and apparatus are susceptible to many variations. Additionally, for clear and brief description, many descriptions of the methods and apparatus have been simplified. Many descriptions use terminology and structures of specific standards. However, the disclosed methods and apparatus are more broadly applicable.

Those of skill in the art will appreciate that the various illustrative logical blocks, modules, units, and algorithm steps described in connection with the implementations disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The above description of the disclosed implementations is provided to enable any person skilled in the art to make or use the invention. Various modifications to these implementations will be readily apparent to those skilled in the art, and the generic principles described herein can be applied to other implementations without departing from the spirit or scope of the invention. For example, although above descriptions focus on imaging sensors, methods and apparatus described above can be applied to any type of sensors including an audio sensor, a video sensor, and other similarly-configured sensors such as a temperature sensor. Accordingly, the techniques are not limited to the specific examples described above. Thus, it is to be understood that the description and drawings presented herein represent a presently preferred implementation of the invention and are therefore representative of the subject matter that is broadly contemplated by the present invention. It is further understood that the scope of the present invention fully encompasses other implementations that may become obvious to those skilled in the art and that the scope of the present invention is accordingly limited by nothing other than the appended claims.

The invention claimed is:

1. An image sensor, comprising:
    a sensing layer having a plurality of sensing elements, each sensing element configured to record light incident on each sensing element;
    an attenuation layer coupled to the sensing layer, the attenuation layer configured with a plurality of attenuation elements and placed between the light and the sensing layer, wherein each attenuation element is configured to modulate the light incident on each corresponding sensing element; and
    a controller coupled to the attenuation layer and configured to individually control each of the plurality of attenuation elements and to adjust attenuation values of transparency of the plurality of attenuation elements, the controller configured to sequentially capture a plurality of images including first and second images from the sensing layer by (1) capturing the first image to determine which sensing elements are saturating, (2) changing the attenuation values for the plurality of attenuation elements corresponding to the saturating sensing elements by increasing the attenuation values by a pre-determined amount for only the plurality of attenuation elements corresponding to the sensing elements that are saturating, and (3) capturing at least one image subsequent to the first image.

2. The image sensor of claim 1, wherein the controller adjusts the attenuation values evenly over the sensing layer.

3. The image sensor of claim 1, wherein the controller is configured to combine the plurality of images to output a high-dynamic range image.

4. The image sensor of claim 1, wherein the controller is configured to apply a pattern of varying densities on the attenuation layer.

5. The image sensor of claim 1, wherein the attenuation layer is configured in multiple layers of independently-controlled attenuation.

6. The image sensor of claim 1, wherein the controller applies different attenuation patterns over time.

7. A method, comprising:
    recording light incident on a plurality of sensing elements of a sensing layer;
    coupling an attenuation layer having a plurality of attenuation elements placed between the light and the sensing layer, wherein each of the plurality of the attenuation elements modulates the light incident on each corresponding sensing element of the plurality of sensing elements;
    individually controlling each of the plurality of attenuation elements and adjusting attenuation values of transparency of the plurality of attenuation elements;
    sequentially capturing a plurality of images including first and second images from the sensing layer by:
        capturing the first image to determine which sensing elements are saturating;
        changing the attenuation values for the plurality of attenuation elements corresponding to the saturating sensing elements by increasing the attenuation values by a pre-determined amount for only the plurality of attenuation elements corresponding to the sensing elements that are saturating; and
        capturing at least one image subsequent to the first image.

8. The method of claim 7, wherein the attenuation values of the transparency are adjusted evenly over the plurality of attenuation element.

9. The method of claim 7, further comprising
    capturing a plurality of images sequentially at the attenuation values.

10. The method of claim 9, further comprising
    combining the plurality of images to produce at least one high-dynamic range image.

11. The method of claim 7, further comprising
    applying a pattern of varying densities on the attenuation layer.

12. The method of claim 7, further comprising
    applying different attenuation patterns over time.

13. An apparatus, comprising:
    means for sensing and recording light incident on a plurality of sensing elements;
    means for attenuating the light incident on the means for sensing and recording placed between the light and the means for sensing and recording, the means for attenuating including a plurality of attenuation elements, wherein each attenuation element is configured to attenuate the light incident on each corresponding sensing element of the plurality of sensing elements;
    means for individually controlling each of the plurality of attenuation elements configured to adjust attenuation values of transparency of the plurality of attenuation elements;
    means for sequentially capturing a plurality of images including first and second images from the means for sensing comprising:
    means for capturing the first image to determine which sensing elements are saturating;
    means for changing the attenuation values for the plurality of attenuation elements corresponding to the saturating sensing elements by increasing the attenuation values by a pre-determined amount for only the plurality of attenuation elements corresponding to the sensing elements that are saturating; and
    means for capturing at least one image subsequent to the first image.

* * * * *